United States Patent [19]

Gross et al.

[11] Patent Number: 5,371,883
[45] Date of Patent: Dec. 6, 1994

[54] METHOD OF TESTING PROGRAMS IN A DISTRIBUTED ENVIRONMENT

[75] Inventors: Kimberly L. Gross, Raleigh, N.C.; Kirk D. Sullivan, Orlando, Fla.

[73] Assignee: International Business Machines Corporation, Armonk, N.Y.

[21] Appl. No.: 37,219

[22] Filed: Mar. 26, 1993

[51] Int. Cl.$^5$ .............................................. G06F 11/00
[52] U.S. Cl. ................................... 395/575; 371/20.4; 371/19
[58] Field of Search ............... 371/15.1, 19, 20.4, 371/25.1, 16.1, 16.5, 18, ; 395/575; 370/13

[56] References Cited

U.S. PATENT DOCUMENTS

| | | | |
|---|---|---|---|
| 4,696,003 | 9/1987 | Kerr et al. | 371/19 |
| 4,710,926 | 12/1987 | Brown et al. | 371/9 |
| 4,797,885 | 1/1989 | Orimo et al. | |
| 4,803,683 | 2/1989 | Mori et al. | |
| 4,953,096 | 8/1990 | Wachi et al. | |
| 5,159,600 | 10/1992 | Chintapolli et al. | 371/27 |
| 5,271,000 | 12/1993 | Engbersen et al. | 370/13 |

OTHER PUBLICATIONS

Carl K. Chang 'Distributed Software Testing with Specification' IEEE 1990 pp. 112–117.
Bogdan Korel 'Automated Test Data Generation for Distributed Software' IEEE 1991 pp. 680–685.

Primary Examiner—Robert W. Beausoliel, Jr.
Assistant Examiner—Albert Décady
Attorney, Agent, or Firm—Lauren C. Bruzzone; Joseph C. Redmond, Jr.

[57] ABSTRACT

An improved method of testing in a distributed environment which is comprised of a Control Program residing in a Control Machine. The Control Machine also contains the central repository of information to control test execution in the Test Machines. The Control Program forwards instructions to a particular Test Program, residing in a Test Machine. The instructions are executed on that machine, and results are reported back to the Control Program. The Control Program verifies whether the results are correct. Depending on the results of the verification, the Control Program sends the test machine further instructions (to continue the test, stop the test, etc.). Logging the results of each test operation, keeping track of the tests performed, and coordinating the test cases are all performed on the Control Machine, by the Control Program.

13 Claims, 3 Drawing Sheets

METHOD OF TESTING PROGRAMS IN A DISTRIBUTED ENVIRONMENT

FIELD OF THE INVENTION

The present invention relates to a method of testing computer programs. More particularly, the invention relates to a method of testing programs in a distributed environment, using a single control machine to control testing and verification of results. Further, this invention relates to an integrated system of tracking and executing tests.

BACKGROUND OF THE INVENTION

Adequately testing a program involves exercising the function of that program under conditions which reflect the environment in which the program was designed to operate. For programs designed to operate on a single computer, testing requires use of actual configurations of machines on which the program was to be run (or a simulation of such configuration) and test data which reflected the range of possible inputs to the program. For programs larger in scale, consisting of multiple subsystems, each subsystem itself composed of multiple modules, adequately testing the whole involves testing each of the modules, integrating the modules into their respective subsystems, testing the subsystem, and finally testing the entire system.

Testing in a distributed environment presents additional problems. A distributed environment is one composed of multiple computer systems operating independently and connected by a common transmission line over which they communicate with each other. Testing a program in the same hardware configuration and operating conditions becomes extremely difficult. (For a discussion of the problems see Mori, et al., Method and Apparatus for Testing a Distributed Computer System, U.S. Pat. No. 4,803,683.) In addition, in the prior art, testing in a distributed environment commonly involved multiple test teams, each working at one of the distributed systems. When changes were made to application programs, testing the changes involved distributing the changed program and associated test cases and coordinating the results of each test team. Thus, considerable effort was required simply to maintain test case libraries and track test case execution status.

Further complicating the problems related to adequately reflecting the operational environment, proper testing in a distributed environment requires precise timing and sequencing of test events, in order to produce consistent, checkable results. This has been difficult, even impossible to achieve using humans and standalone tools. Another challenge to testers is the task of tracking testcase status across multiple sets of distributed systems, perhaps including several different versions of the software system, has proven to be difficult and time-consuming.

OBJECTS OF THE INVENTION

It is therefore an object of the invention to provide an improved testing method for a distributed environment by providing a centralized test environment with a single control process which exclusively governs test sequencing and timing.

It is a further object of the invention to allow easier synchronization of the execution of testing across multiple machines.

It is a further object of the invention to provide a centralized database of test case information, to be used in planning, tracking, and as input to the control process.

It is a further object to provide a central point at which all verification of test results is performed, simplifying the complexity of test programs and allowing for a more realistic measurement of performance of the system being testing.

SUMMARY OF THE INVENTION

The invention is comprised of a Control Program residing in a Control Machine. The Control Machine is connected to other Test Machines through communications link, thus forming a distributed network. One or more Test Programs may run in the Test Machines, or, alternately, in the Control machine. A central repository of information to create, maintain, and define the test information is also part of the invention. From this central repository comes data indicating which testcases are to be run, which is passed to the Control Program. The central repository may be associated with the Control Machine or one of the Test Machines. Stored in the central repository are Test Cases. These are specific sequences of inputs or items of data, which are designed to exercise a Test Program.

The Control Program forwards instructions from a Test Case to one or more Test Programs to be executed. Thus, the Control Program maintains control of the sequence of execution. The results of the execution by the Test Program are reported back to the Control Program. The Control Program verifies whether the results are correct. Depending on the results of the verification and startup parameters, the Control Program sends the further instructions to Test Programs. Logging of testcase results, tracking of the testcases performed, and coordinating the test cases are all performed by the Control Program. Result data is passed to the central repository for storage and later querying and reporting by users.

The foregoing and other advantages of the invention will be more fully understood with reference to the description of the preferred embodiment and with reference to the accompanying drawings described in the following section.

DESCRIPTION OF THE PREFERRED EMBODIMENT OF THE INVENTION

Figure 1:
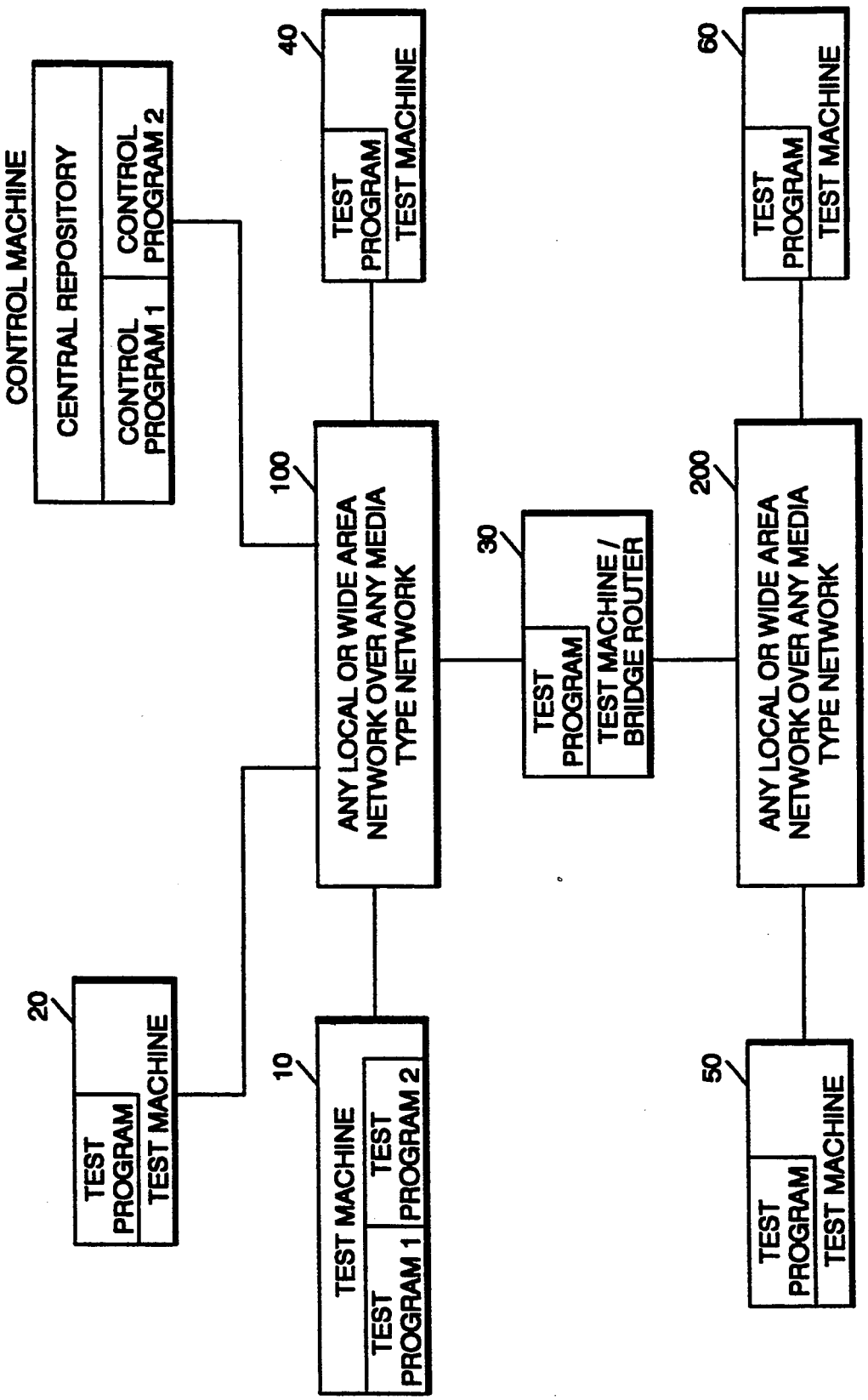
FIG. 1 is a diagram of a distributed environment, comprised of a Control Machine and several Test machines, interconnected through a network.

FIG. 1 is a diagram an illustrative configuration of a distributed processing system which represents the preferred embodiment of this invention. Shown in the figure is a network 100, to which are connected the Control Machine 1 and distributed processors or Test Machines 10, 20, 30 and 40. Control Program 2 is resident on Control Machine 1. Test machine 30 acts as a bridge machine, being also connected to network 200, and providing a means by which Test machines on network 100 can communicate with machines on network 200. Test Machines 50 and 60 are connected to network 200. Note that in the aforementioned diagram, any method of bridging/routing may be used, if supported by the underlying protocol used to attain communications between the various machines on the network.

Figure 2:
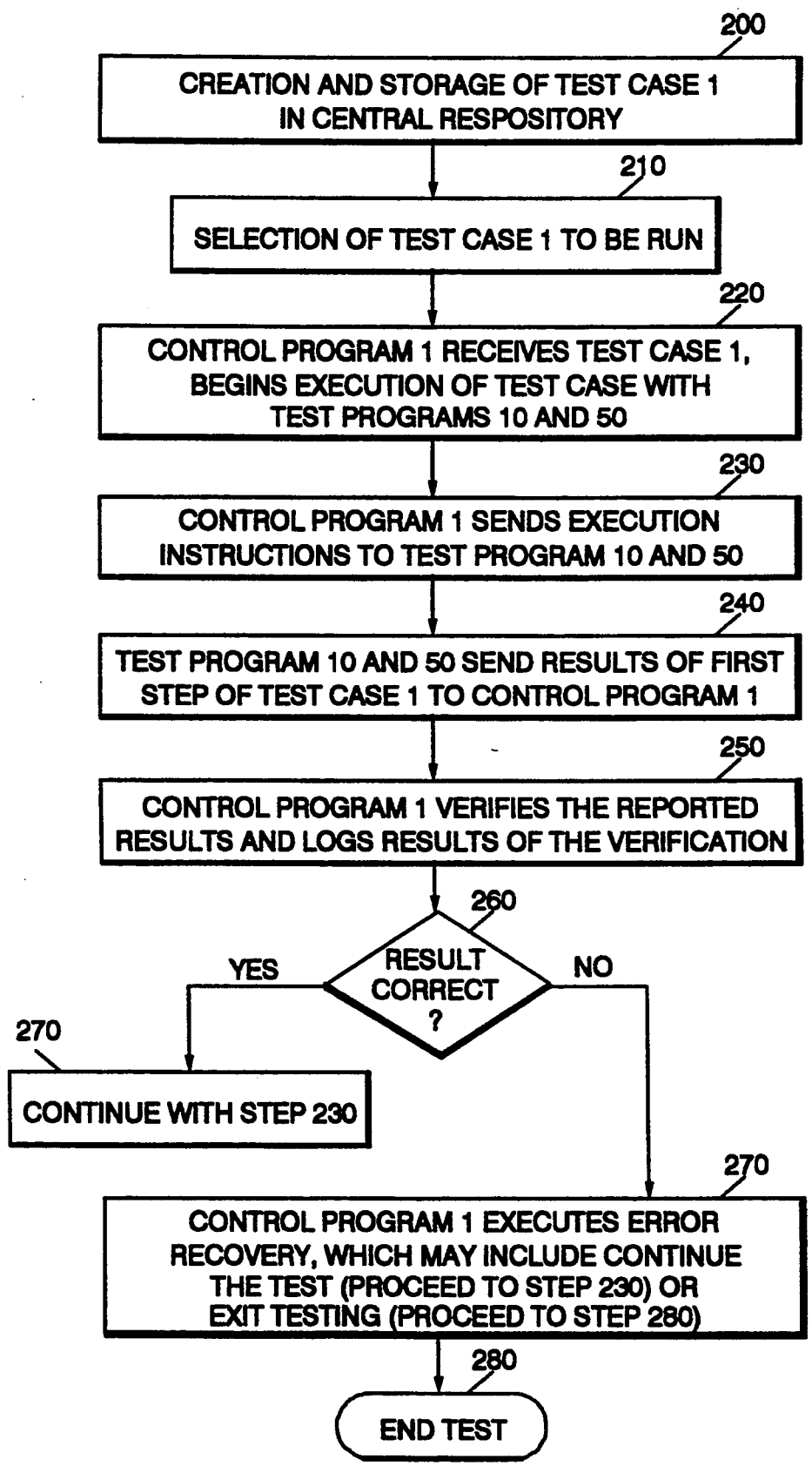
FIG. 2 is a flow diagram of the invention.

FIG. 2 is a flowchart of one embodiment of the invention. In FIG. 2, step 200 shows the creation and storage of Test Case 1 in the central repository. Thus, in the preferred embodiment, Control Machine 1 contains the central repository of all test cases and their expected results. In step 210, the user interacts with the central repository to select which testcases are to be run by the Control Program. In step 220, the Control program begins communicating with Test Program 10. In step 230, the Control Program sends instructions to Test Program 10, defining the execution of one or more steps of Test Case 1. In step 240, Test Program 10 report the results of the execution of previously defined steps back to the Control Program. In step 250, the Control Program verifies the reported results, given the definition of proper results from the Test Case definition. As shown in step 260, one of two things may happen. The test result may have been the same as the expected result. In this case, the results are "correct" or the verification is deemed "successful". When this occurs, Control Program 1 continues with the exercise of the Test Case, sending the next instruction to Test Program 10. If, on the other hand, the test results are different from what was expected (i.e. the results were "incorrect" and the verification is deemed "unsuccessful"), then Control Program 1 will perform error recovery procedure. Depending on the results of the error recovery procedure, Control Program 1 will either instruct Test Program 10 to proceed with the test (step 270) or end the test (step 280), depending on start parameters. At the end of the test (that is, the point at which either the entire test case has been executed or a stop-test decision has been made and executed), the Control Program 1 uses the logged data to communicate the results of the test to the central repository. The user may then query the central repository or look directly at the logs of the Control Program to determine the test result.

The following is a more detailed discussion of some of the steps enumerated above.

CREATION AND STORING OF TEST CASES

The purpose of a Test Case is to exercise a Test Program in much the same way as it would be exercised in normal operation. That is, a Test Case is comprised of specified inputs to the Program (for example, a screen with an amount of money, an interest rate and a length of time which a user would normally input to a screen) and expected outputs (for example, a second screen with the interest calculated from the inputs).

Accordingly, the process of creating test cases consists of several steps. The first step is to identify all externally recognizable functions performed by the system. The next step is to generate functional variations. This involves expanding on those functions to include variations of the input values, conditions, and even output values. The last step is to select combinations of these variations to form test cases.

The nature of the specified inputs to a test case depend on the type of interface used by the software application to be tested. Generally speaking, there are two types of application interfaces: user interfaces (typically either a full-screen panel based interface or a command interface) and programming interfaces (CALL level interfaces).

The initial step in creating a Test Case is to define to the central repository the panels, commands and programming interface calls used by the program to be tested. Each of these definitions (of a panel, command, or call) is referred to as a sys/def. The definitions include all fields or parameters that are used for input and/or output.

Each field of a panel, command or call is further described, with the components of the description depending on the requirements of the test environment. Typically, each field has an associated name and length (number of characters). In any environment, the description of each field consists of identifying it as to data field type (input, output, or both), field type (specific to environment), selection field type (single or multiple selections allowed), etc. Commands are defined as input only. For programming interfaces, the fields are defined as input, output or both.

For each defined field, all values that must be used in any test case must be defined. Each value definition has a name and a value. In addition, such definitions can be grouped into classes.

Once the definitions of each field or parameter is completed, the definitions are stored as a unique entry in the central repository.

Figure 3:
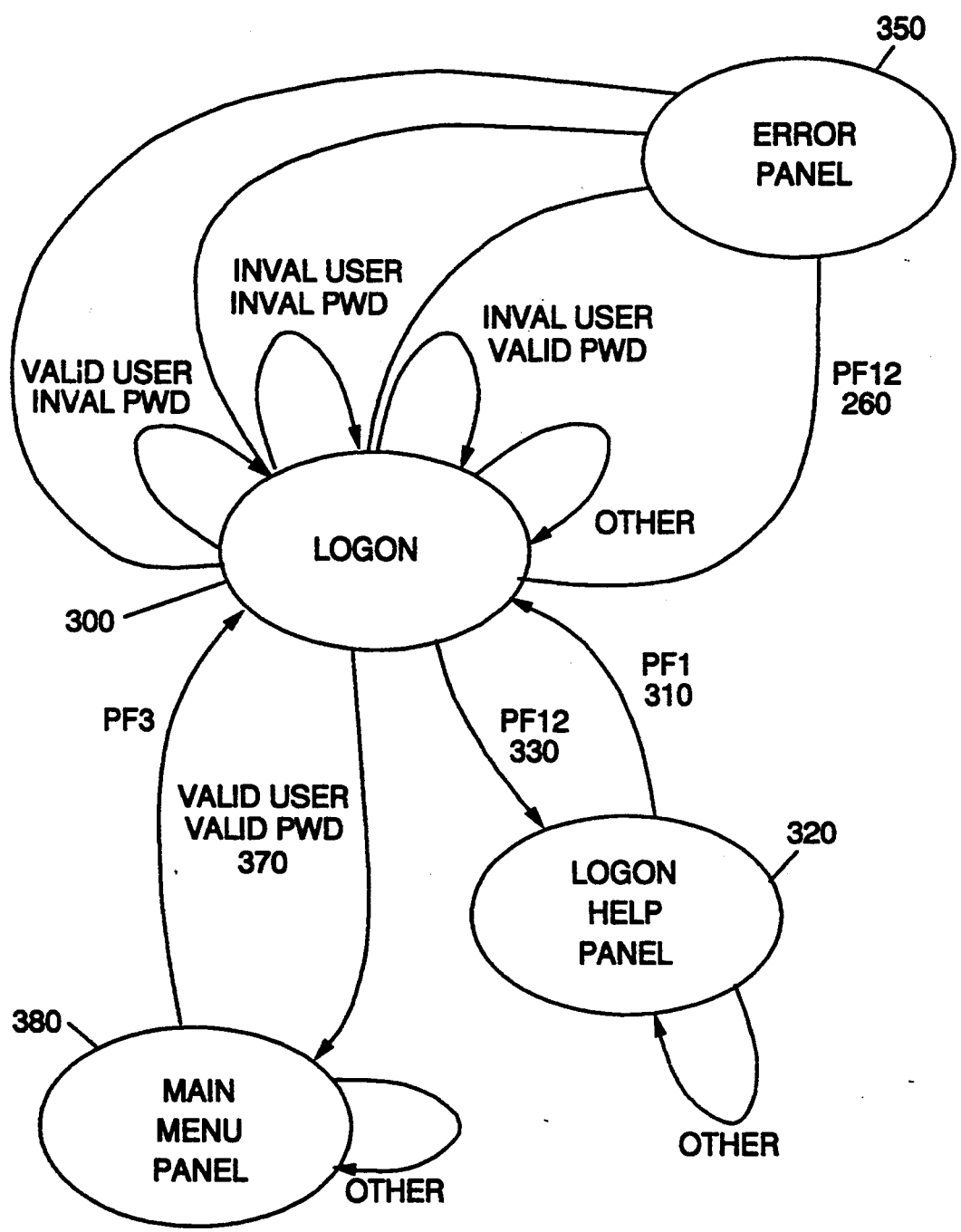
FIG. 3 is a directed tree diagram of a logon procedure

Following the completion of the sys/defs, variations—each of which describes the movement from a first sys/def to a second—are defined. Variations reflect the sequence of actions which are to be tested. For example, consider a typical logon procedure. The panels required would be the logon panel (sys/def 1), the help panel (sys/def 2), the main menu (sys/def 3), and an error panel (sys/def 4). Referring to the directed tree diagram FIG. 3, panel variations for a logon procedure could be defined as follows:

start at the logon panel 300 (sys/def 1)
enter PF1 310, this brings the user to the help panel 320 (sys/def 2)
enter PF12 330, returning to logon panel 300 (sys/def 1)
enter an invalid userid and/or password 340, bringing the user to an error panel 350 (sys/def 4)
enter a valid userid and password 370, bringing the user to the main menu 380 (sys/def 3).

Once the variations are defined, the user specifies those values (previously defined) which are applicable to each particular variation.

Test cases are built on the definitions discussed in the preceding paragraphs. The user generates a test case by selecting variations, and combinations of variations. For example, a user could select one or more variations, variation classes, sys/defs, sys/def classes or nodes. A selection of a sys/def or node results in the controlling machine constructing paths that connect all select objects. The defined directed trees are used to extend the constructed paths to the top level of the directed tree and the bottom level, thus providing the entire control flow. A test case is constructed by starting at the top point of the directed tree and flowing downward. Each path to the lowest point of the tree is considered a separate test case. Each sys/def of each variation on the given path can be equated to a "step" the program must execute.

In addition to specifying the variations which are to be included in a test case, the user must specify the values to be used. These values are selected from the corresponding variation value definitions. If data relation definitions exist, the user can use those definition to specify more than one value at a time.

Each variation selection the user makes is affected by test case rules, as defined by the user. That is, a test case rule defines the exact combinations of variations allowed in combination. Thus, the test case rules may include:
- include the following variation class (or individual variation)
- exclude the following variation from the class previously selected
- variation A must follow variation B
- variation A cannot follow variation B
- can start (command/call only: this provides the system with a "top" to the hierarchy where the testcase may be begun)
- can end (command/call only)
- variation A can follow variation B (default)

These definitions can aid the user in controlling the generation of test cases to exactly fit the current testing requirement.

EXECUTING A TEST CASE

Once defined, Test Cases are stored in the central repository. Referring to FIG. 1, the Control Program 1 at the Control Machine will communicate with the Test Program 10, executing the test as previously described. Each sys/def in the Test Case definition will be executed, with results being returned to the Control Program 1. Control Program 1 compares the returned result against the expected result, i.e. verifies the result.

VERIFICATION

Verification takes place after the execution of the first step is executed in Test Case 1. For each variation, multiple verification actions can be defined and the execution order can be specified. Examples of some of the verifications that can occur are as follows:

Panel Verification

Panel verification is normally done for a panel test. In this type of verification, the entire screen or panel is compared with a predefined panel. Another alternative is for certain portions of the screen to be "blocked out" and the comparison performed only on the remaining portions of the screen.

Text Verification

For command and panel tests, the returned information is checked for certain strings of text. In panel tests, the information may be searched for at a specific location on the returned panel. Alternatively, the entire screen may be searched for the string of text.

Field Verification

For panel tests, individual fields may be verified. For text panels, field length and cursor location are defined. For graphic panels, each field value to be checked must be captured from the panel. (This is typically accomplished by providing the controlling machine with a panel with the field in question populated by the needed value.)

Parameter Verification

For programming interface calls, each one of the parameters returned from the call may be checked for specific values.

File Comparison

Any two files, existing anywhere on the token ring, can be compared and verified.

External Verification Program

A program can be run in Control Program 1 which performs some user-defined procedure. Depending on the results of the procedure, the program returns a return code to the Control Program 1 which indicates the success or failure.

PROCEDURES AFTER VERIFICATION

If the verification is successful, Control Program 1 will continue sending instructions to Test Program 10 to continue the testing. On the other hand, if verification fails, error recovery procedures are executed.

ERROR RECOVERY

Error recovery could include any of:
- logging the error
- ending test execution
- continuing test execution
- executing defined error recovery procedures

REPORTING THE RESULTS OF TESTING

As part of its function, the Control Machine keeps track of each test case that is executed, maintaining details of its execution. These details include, for example, the date an time of execution, a summary of execution results, performance data saved during execution, and elapsed time of the test case execution. This data is automatically passed to the central repository.

Using the central repository of information, the user can produce many reports on the status of tests, the history of test execution, detailed reports on errors occurring during execution, environment under which a test has been run, and many other reports.

ADDITIONAL MODIFICATIONS

Depending on the requirements of the user, additional hardware could be added to the above described system. There is no limit as to the hardware configuration supported by the invention, as long as the various Control and Test Machines can communicate over the selected communications protocol. If access to a host-based local reporting system is required, then the central repository must be connected to that host system using required hardware and software emulators.

The embodiment described above is a single station test, that is, a single test being executed through one Test Program. A modification of this embodiment comprises a simultaneous test using one or more Test Programs. In this embodiment, a test case consists of a number of steps. These steps can be assigned to run a particular station number. These station numbers can be assigned to any particular Test Program running in any machine in the test configuration. That is, the user can describe the Test Case so that steps are executed by multiple systems, in varying order. This gives an opportunity of testing the interaction of various application interfaces with each other, and varying the machines involved in the testing without altering the definitions of the Test Cases.

In order to define a multi-station Test Case, the user generally starts with defined individual test steps. The user then defines dependency information between test steps. There are two types of such information: serial execution between test steps and parallel execution of test steps.

In the case of serial execution between test steps, defining a dependency means that a given test step must run before the dependent test case step can be run. If an individual test step involves some error checking that would adversely affect other test steps that might be running, that test step must run by itself. The requirement can be either that the test step must run alone on a given machine (no other test station on the specified test machine can be executing a test step at the same time) or that the test step must run alone on the Control program (which means that no other test step can be running).

In the simplest version of a multi-station test, once the appropriate Test Cases are stored in the central repository, Control Program 1 will send Test Case 1 step 1 definition over network 100 to Test Program 10 and Test Case 1 step 2 definition over network 100 to Test Program 50. Depending on the definition of the dependency of the steps, the Control Program will instruct the Test Programs to execute step 1 and step 2. Test Program 1 executes step 1 and returns the result to the Control Program. Test Program 2 executes step 2 and returns the result to the Control Program. Control Program 1 then performs verification of step 1 and step 2. Error recovery procedures will be defined to determine actions for all the permutations of correct and incorrect results.

Clearly the number of Test Cases and Test Programs engaged in any test is limited only by the number of machines attached to the Control Machine by some network connection. In FIG. 1, Test Machines 10, 20, 30, 40, 50, and 60 could all be executing Test Cases. Control Program 1 keeps track of the status of each Test Program as they execute the successive steps of their associated Test Cases simultaneously. As each of the Test Programs report results to Control Program 1, the results are verified and logged. Separate output logs are maintained for each executed Test Case. Reports can be printed out via the central repository. The Control Program sends the status of executed Test Cases back to the central repository.

An additional modification of this embodiment comprises a Test Case being executed on the Control Machine, itself.

The basic procedure described in both the single station and multi-station testing environment is one in which a test case is created, stored, and sent to other systems by automated means. Another method of testing which can be used is a user interactive, ad hoc testing procedure in which the user can interact with a program in the controlling machine, selecting a call to execute and data to pass to the system under test. These test cases are then saved, edited and tracked as any other test case.

The above described invention provides a more convenient technique for testing programs in a distributed environment. As discussed above, by using the central repository of test cases and their expected results, the invention avoids the problems of keeping track of and coordinating differing test cases. It also provides a convenient means of executing multi-station testing, where the interaction of multiple test machines is at issue. Finally, by having all test results on a single system, it makes simple the creation of reports comparing the results of the various systems and tests.

It should also be noted that since the error recovery is performed at the Control Program, traffic over the network is minimized. That is, additional messages need not be sent from the Test Program to the Control Program to determine error recovery actions. In addition, expert systems or artificial intelligence can be installed in the Control Program to deal with the error—without requiring this program to be installed at each of the Test Machines.

While the invention has been particularly shown and described with reference to the preferred embodiment thereof, it will be understood by those skilled in the art that various changes in detail may be made therein without departing from the spirit, scope, and teaching of the invention. Accordingly, the system and method herein disclosed is to be considered merely as illustrative, and the invention is to be limited only as specified in the claim.

We claim:

1. In a distributed processing system comprising a Control Machine and one or more Test Machines, said Control Machine and said Test Machine connected to each other through a network, a method for testing software comprising the steps of:
   a. storing one or more Test Cases in a central repository, each of said Test Cases comprised of a sequence of one or more inputs, said sequence having a first input and a second input, and each of said inputs having an associated expected output;
   b. storing one or more error recovery instructions in said central repository, associating each of said instructions with one or more inputs;
   c. in said central repository, selecting a Test Case to be executed, and sending said Test Case to a Control Program in a Control Machine;
   d. sending said first input from said Control Program over a network to a first Test Program in a Test Machine;
   e. executing said first input in said first Test Program, said execution resulting in a first test result;
   f. sending said first test result from said first Test Program to said Control Program over said network;
   g. verifying said first test result in said Control Program by comparing said first test result with said associated expected result of said first input if said first test result is the same as said associated expected result, said verification being deemed successful if said first test result differs from said associated expected result, said verification being deemed unsuccessful;
   h. if said verification is successful, sending said second input from said Control Program to said first Test Program; and
   i. if said verification is unsuccessful, selecting said error recovery instruction associated with said first input and sending said error recovery instruction associated with said first input from said Control Program to said first Test Program.

2. A method as in claim 1 further comprising the steps of said Control Program logging said verification in a log stored in said Control Machine, and said Control Program sending said first test result to said central repository.

3. A method as in claim 2 further comprising the steps of producing a report from said log stored in the said central repository.

4. A method as in claim 1, further comprising the steps of:
   in said central repository, selecting a second Test Case to be executed, and sending said second Test Case to said Control Program; and
   executing steps d through i with said second Test Case inputs and said first Test Program.

5. A method as in claim 1, further comprising the steps of:
   sending said second Test Case inputs to a second Test Program on a second Test Machine and executing steps d through i with said second Test Case inputs and said second Test Program.

6. A method as in claim 5 further comprising the step of said Control Program logging each of said verifications in one of a plurality of logs stored in said Control Machine, and sending the results of execution of said first Test Case and said second Test Case to said central repository.

7. A method as in claim 6 further comprising the steps of producing a report from said logs.

8. In a distributed processing system comprising a Control Machine and a plurality of Test Machines, said Control Machine and said Test Machines connected to each other through a network, an improvement comprising:
   a. means for storing one of more Test Cases in said central repository, each of said Test Cases comprised of a sequence of one or more inputs, said sequence having a first input and a second input, and each of said inputs having an associated expected result;
   b. means for storing one or more error recovery instructions on said central repository, each of said instructions being associated with one or more of said inputs;
   c. means in said Control Machine in for selecting a first Test Case;
   d. means in said Control Machine for sending said first input of said first Test Case over said a network to a first Test Machine:
   e. means in said first Test Machine for executing said first input, said execution resulting in a first test result;
   f. means in said first Test Machine for sending said first test result to said Control Machine over said network;
   g. means in said Control Machine for verifying said first test result by comparing said first test result with said associated expected result of said first input, where said verification is deemed successful if said first test result is the same as said associated expected result or said verification is deemed unsuccessful If said first test result differs from said associated expected result;
   h. means in said Control Machine to send said second input to said first Test Program if said verification is deemed successful; and
   i. means in said Control Machine of executing said error recovery instruction associated with said first input if said verification is deemed unsuccessful.

9. A system as in claim 8 further comprising a means in said Control Machine to log said verification in a log stored in said central repository, and means in said Control Machine to store said first test result in said central repository.

10. A system as in claim 9 further comprising a means of producing a report from said central repository.

11. A system as in claim 8, in which said selection means also selects a second Test Case and the means listed in steps d through i provide the same function to said second Test Case.

12. A system as in claim 11 further comprising means in said Control Machine to log each of said verifications of said first test results of said first and second Test Cases in one of a plurality of logs stored in said central repository and means of storing said test results of said first and second Test Cases in said central repository.

13. A system as in claim 12 further comprising means of producing a report consisting of data from said central repository.

* * * * *